US008682023B2

(12) United States Patent
Dotchevski et al.

(10) Patent No.: US 8,682,023 B2
(45) Date of Patent: Mar. 25, 2014

(54) INTERACTIVE DISPLAY RECOGNITION DEVICES AND RELATED METHODS AND SYSTEMS FOR IMPLEMENTATION THEREOF

(76) Inventors: Emil Stefanov Dotchevski, Marina del Rey, CA (US); Richard Darrel Wyckoff, Los Angeles, CA (US)

( * ) Notice: Subject to any disclaimer, the term of this patent is extended or adjusted under 35 U.S.C. 154(b) by 763 days.

(21) Appl. No.: 12/425,260

(22) Filed: Apr. 16, 2009

(65) Prior Publication Data

US 2009/0262190 A1 Oct. 22, 2009

Related U.S. Application Data

(60) Provisional application No. 61/045,562, filed on Apr. 16, 2008.

(51) Int. Cl.
*G06K 9/62* (2006.01)
(52) U.S. Cl.
USPC ............................ 382/100; 382/313; 345/157
(58) Field of Classification Search
None
See application file for complete search history.

(56) References Cited

U.S. PATENT DOCUMENTS

| | | | |
|---|---|---|---|
| 5,448,261 A | 9/1995 | Koike | |
| 6,535,198 B1 | 3/2003 | Fan | |
| 6,853,751 B1 * | 2/2005 | Milligan et al. | 382/199 |
| 6,971,753 B2 | 12/2005 | Tseng | |
| 7,142,198 B2 | 11/2006 | Lee | |
| 7,315,751 B2 | 1/2008 | Kurakane | |
| 7,477,236 B2 | 1/2009 | Ofek | |
| 2001/0050672 A1 | 12/2001 | Kobayashi | |
| 2002/0092025 A1 | 7/2002 | Klumpp | |
| 2003/0132913 A1 | 7/2003 | Issinski | |
| 2004/0239653 A1 | 12/2004 | Stuerzlinger | |
| 2005/0174488 A1 | 8/2005 | Chennakeshu | |
| 2005/0246742 A1 | 11/2005 | Benco et al. | |
| 2006/0119588 A1 | 6/2006 | Yoon et al. | |
| 2006/0152489 A1 | 7/2006 | Sweetster | |
| 2006/0172766 A1 | 8/2006 | Kim et al. | |
| 2007/0060383 A1 | 3/2007 | Dohta | |
| 2007/0067808 A1 | 3/2007 | DaCosta | |
| 2007/0130582 A1 | 6/2007 | Chang et al. | |
| 2007/0214484 A1 | 9/2007 | Taylor et al. | |
| 2007/0250871 A1 | 10/2007 | Wu et al. | |
| 2007/0290995 A1 | 12/2007 | Ting | |
| 2008/0034096 A1 | 2/2008 | Tourzni et al. | |
| 2008/0036851 A1 | 2/2008 | Patel | |
| 2008/0092177 A1 | 4/2008 | Swanburg et al. | |
| 2008/0143676 A1 | 6/2008 | Choi | |
| 2008/0174551 A1 | 7/2008 | Ishibashi | |
| 2008/0180395 A1 | 7/2008 | Gray | |
| 2008/0188959 A1 | 8/2008 | Kneissler | |
| 2008/0239081 A1 * | 10/2008 | Helbing | 348/169 |
| 2008/0266251 A1 | 10/2008 | Chao | |
| 2008/0278445 A1 | 11/2008 | Sweetster | |
| 2008/0309619 A1 | 12/2008 | Leung | |
| 2010/0023975 A1 | 1/2010 | Gupta et al. | |
| 2010/0251292 A1 | 9/2010 | Srinivasan et al. | |

OTHER PUBLICATIONS

International Search Report of Dec. 7, 2009 for PCT/US09/040873.

* cited by examiner

*Primary Examiner* — Brian P Werner
(74) *Attorney, Agent, or Firm* — McKenna Long & Aldridge LLP

(57) ABSTRACT

An interactive display recognition tool uses imaging devices to determine the location of a display and position an icon on the display via a computer. The tool comprises various input devices, which can be used to control the icon and interact with a computer driven multimedia platform.

19 Claims, 3 Drawing Sheets

INTERACTIVE DISPLAY RECOGNITION DEVICES AND RELATED METHODS AND SYSTEMS FOR IMPLEMENTATION THEREOF

RELATED APPLICATIONS

This application claims the benefit of and priority to U.S. Provisional Application Ser. No. 61/045,562, filed Apr. 16, 2008, the contents of which are incorporated by reference herein in its entirety

BACKGROUND

This disclosure relates to interactive pointing devices and systems for implementing the same useful in controlling media driven pointers on displays such as televisions, computer monitors, and other viewing devices.

SUMMARY

An interactive display recognition tool uses imaging devices to determine the location of a display and position an icon on the display via a computer. The tool comprises various input devices, which can be used to control the icon and interact with a computer driven multimedia platform.

According to a feature of the present disclosure a device is disclosed comprising a display recognizer to recognize a display in a space, at least one input device, and a communicator for sending data to a computer.

According to a feature of the present disclosure a system comprising a display recognition device having at least a display recognizer and a input device, a computer providing a multimedia platform and receiving data from the display recognition device, and a sender and a receiver connected to the computer, wherein the receiver is connected to a display and wherein the sender and receiver facilitate transfer of a signal from the computer to a display.

According to a feature of the present disclosure a method comprising capturing at least one image of a space with a display recognition device having display recognizer, the space having within it a display, identifying the quadrilaterals in the space to obtain a set of identified quadrilaterals, determining the length to width ratio of each identified quadrilateral to identify a set of qualifying quadrilaterals substantially having a predetermined ratio, resolving the qualifying quadrilaterals to select a selected quadrilateral, and determining a location on the selected quadrilateral where the display recognition device is pointed.

According to a feature of the present disclosure a method comprising providing a system that at least: captures at least one image of a space with a display recognition device having display recognizer, the space having within it a display, identifies the quadrilaterals in the space to obtain a set of identified quadrilaterals, determines the length to width ratio of each identified quadrilateral to identify a set of qualifying quadrilaterals substantially having a predetermined ratio, resolves the qualifying quadrilaterals to select a selected quadrilateral, and determines a location on the selected quadrilateral where the display recognition device is pointed.

DRAWINGS

The above-mentioned features and objects of the present disclosure will become more apparent with reference to the following description taken in conjunction with the accompanying drawings wherein like reference numerals denote like elements and in which.

DETAILED DESCRIPTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, biological, electrical, functional, and other changes may be made without departing from the scope of the present invention. The following detailed description is, therefore, not to be taken in a limiting sense, and the scope of the present invention is defined only by the appended claims. As used in the present disclosure, the term "or" shall be understood to be defined as a logical disjunction and shall not indicate an exclusive disjunction unless expressly indicated as such or notated as "xor."

The term "computer" shall be understood to have the meaning commonly associated and known by artisans including, but not limited to, personal computers and personal digital assistants, portable devices having a microprocessor or capable of performing functions traditionally associated with computers, console-type multimedia devices, and set-top devices used to communicate multimedia content to displays.

The present disclosure is directed to novel methods of interactive communication with displays, such as televisions, large stadium displays, arena displays, and billboards. Such interactivity allows users viewing the displays to interactively point and select items shown on a display, much like computer users interact with a computer graphical user interface (GUI) with a mouse.

Figure 1:
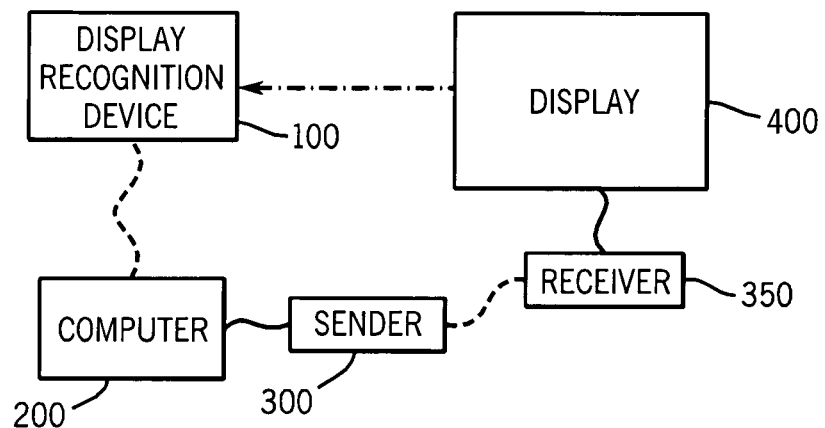
FIG. 1 is a block diagram of an embodiment of the interrelationship of a display recognition device and a display.

According to embodiments, the present disclosure comprises a display recognition device (DRD) 100, computer 200, sender 300 and receiver 350, and a software application that are integrated with display 400, as illustrated in FIG. 1. DRD 100 is configured to recognize display 400. By determining where DRD 100 is pointed relative to display 400, an icon is shown on display 400 and a user is permitted to interact with computer 200 having multimedia content. DRD 100 communicates information retrieved to computer 200. Computer 200 positions an icon on display 400 by sending data between sender 300 and receiver 350, according to embodiments. Receiver 350 outputs a signal to display 400, including an icon having a position determined by the position at which DRD 100 is pointing.

According to embodiments, a computer operating system is disclosed, which operates as a program within a third party operating system and which is designed to facilitate communication with DRD 100, computer 200, sender 300 and receiver 350. The operating system is designed to run programs compiled and optimized for the operating system and is further optimized for output to the display. According to embodiments, the operating system provides a signed environment, whereby only signed programs may run within the overlaid operating system's environment.

Figure 2:
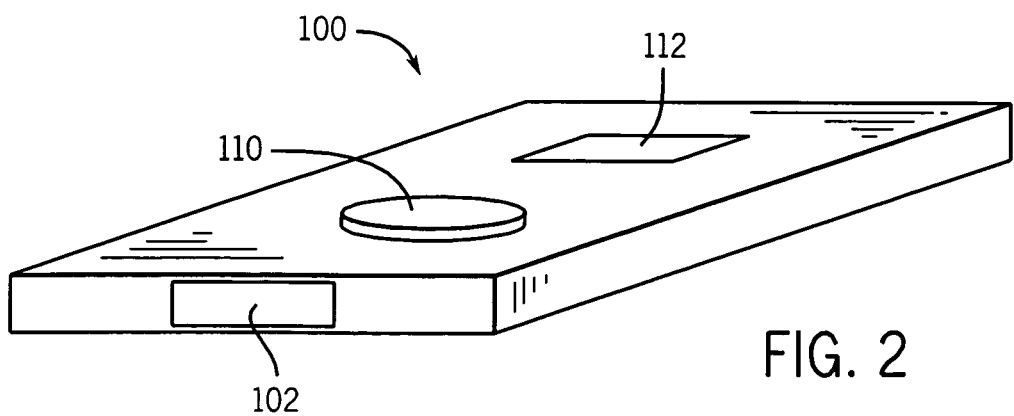
FIG. 2 is a perspective view of an embodiment of a display recognition device of the present disclosure.

According to embodiments and as illustrated in FIG. 2, there is shown an embodiment of DRD 100. DRD 100 comprises display recognizer 102 and controls 110, 112. Display recognizer 102 comprises an imaging device, which images the space in which display is positioned and identifies display. According to embodiments, display recognizer 102 may be a video camera, charge-coupled device (CCD) or acoustic imaging device. Generally, display recognizer 102 may be any device that is able to form an image of the environment in which display is located, whereby the position of display 400 is able to be deduced as explained in greater detail below. Controls 110, 112 comprise input devices that allow for users to communicate with computer 200, including but not limited to, buttons, dials, touch pads, joysticks, voice activated output devices, microphones, etc. Artisans will recognize the many variations of display recognizer 102 and controls 110, 112 that are possible according to the general principles disclosed herein.

According to embodiments, display recognizer 102 may be a CCD, CMOS digital sensor, or other digital or analog video imaging device useful for capturing video or still images. As display recognition device 100 is aimed at display 400, display recognizer 102 captures images of the space where display 400 is located. From the captured images, display location is determined as disclosed in detail below, for example based on aspect ratios (i.e., the width divided by the height) of common displays. As used herein, the term "captured image" may mean complete images captured much like a photograph or may mean other imaging techniques, for example scanning of lines. After display location is determined, an icon on display is shown via computer 200, sender 300, and receive 350, whereby the icon corresponds to the location on display 400 where display recognition device 100 is pointed.

Display recognizer 102, according to embodiments, captures images in the visual electromagnetic (EM) range. According to embodiments, display recognizer 102 captures images in the infrared EM range. According to embodiments, display recognizer 102 may capture images in other EM ranges.

According to embodiments, display recognizer 102 may be an acoustic signaler, such as one that images a space based on echolocation-type technologies. According to embodiments, display recognizer 102 may be a light detection and ranging (LIDAR) device, such as one that measures properties of scattered light to find range or other information of a distant target. An output from display recognizer 102 may comprise a point cloud corresponding to the results of the operation of display recognizer 102.

According to embodiments, DRD 100 is a handheld, remote control-like device. According to embodiments, DRD 100 may comprise a handheld device that has greater processing power, for example having an ARM processor as used in personal digital assistant type devices. DRD 100 may also comprise controllers that are designed specifically for use together with a video game platform. According to embodiments, DRD 100 is pointable by a user, whereby it may be variably oriented with respect to display 400.

DRD 100, according to embodiments, is battery powered. Low power embodiments of DRD 100 may be powered by alkaline battery sources, for example. Higher power requirements may require specialized power sources, for example nickel metal hydride batteries or lithium ion batteries. Artisans will clearly understand the requisite power requirements necessary for each embodiment on a case by case basis and provide a suitable power source without undue experimentation.

According to embodiments, controllers 110, 112 (for example as illustrated in the exemplary embodiment in FIG. 2) provide an input mechanism for manipulation of display content, which is displayed via computer 200, sender 300, and receiver 350. As illustrated in FIG. 2, controller may comprise button 112, and touch receptive dial 110. These input mechanisms are mapped to at least one command on computer 200, thereby allowing users of DRD 100 to interface with and communicate inputs to computer 200, which inputs are correspondingly shown by icons or events on display 400. Artisans will readily appreciate that the configuration of input devices may take on various forms and include many variable components. For example, keyboards, keypads, additional buttons, touch screens, touch pads, scrolling wheels, accelerometers, vibrating devices, gravity sensing devices, audio-responsive devices, and other input devices installable on remote controls, gaming controls, or computers are appropriate and are expressly contemplated by the present disclosure.

DRD 100 further comprises, according to embodiments, a transmitter and receiver for wireless communication between DRD 100 and computer 200. Such wireless protocols for transfer of data may be proprietary and optimized for the transfer of specific data from DRD 100 to computer 200, or may be transferred according to well established protocols such as IEEE 802.11 or Bluetooth (e.g., IEEE 802.15.x). According to embodiments, as discussed further herein, a similar type of connection may exist between computer 200 and display 400.

According to embodiments, an icon, for example an arrow or a crosshair, on display 400 is moved or actuated by moving DRD 100. In other words, the icon substantially tracks where DRD 100 is pointed relative to display 400. If DRD 100 is pointed at the center of display 400, then the icon is centered in the center of display 400; if DRD 100 is moved from pointing at the center of display 400 to the upper left of display 400, then the icon is repositioned to track the movement whereby the icon always substantially points to where DRD 100 is pointed until DRD 100 and the icon are pointing to the upper left of display 400. According to embodiments, movement is polled by computer 200 or communicated from DRD 100 to computer 200 on a relatively rapid basis whereby the movement of the icon across the screen appears to be smooth as it tracks the movement of DRD 100.

According to embodiments, the orientation, location, and motion of DRD 100 relative to display 400 may have a 1:1 correlation with the location of the icon displayed on display 400, as described above. According to embodiments, the relative motion of DRD 100 may be multiplied by a coefficient (e.g., a "factor"), such that the relative motion of DRD 100 may translate into a suppressed or exaggerated motion of the icon displayed on display 400. According to embodiments, the location of an icon to be shown on display 400 may comprise a direction from a center of display 400 and a distance from the center of the display. The direction to the icon from the center of display 400 corresponds to the direction from the center of the quadrilateral to where DRD 100 is pointed. The distance of the icon from the center of display 400 is the distance from the center of the quadrilateral to where DRD 100 is pointed, multiplied by a coefficient greater than, less than, or equal to 1. According to embodiments, the relationship between the distance of the icon from the center of display 400 and the distance from the center of the quadrilateral to where DRD 100 is pointed may be linear, exponential, or be of variable sensitivity. According to embodiments, the factor may be a constant, a variable, or a function of other known or determinable conditions.

For example, according to embodiments, if DRD 100 is pointed at the center of display 400, then the icon is centered in the center of display 400; if DRD 100 is moved from pointing at the center of display 400 to the upper left of display 400, then the icon is repositioned according to the direction of the movement of DRD 100, but in a manner merely proportionate to the movement of DRD 100 (e.g., by a factor greater than or less than one). Thus, DRD 100 may be pointed at a location beyond the upper left boundary of display 400, and an icon may be displayed in the upper left of display 400 (where the factor is less than 1), thereby causing the icon movement on display 400 to be perceived as "slower" and less responsive to minor movements of DRD 100. Alternatively, DRD 100 may be pointed at a location within the upper left boundary of display 400, and an icon may be displayed at the upper left boundary of display 400 (where the factor is greater than 1), thereby causing the icon movement on display 400 to be perceived as "faster" and more responsive to minor movements of DRD 100.

Figure 3:
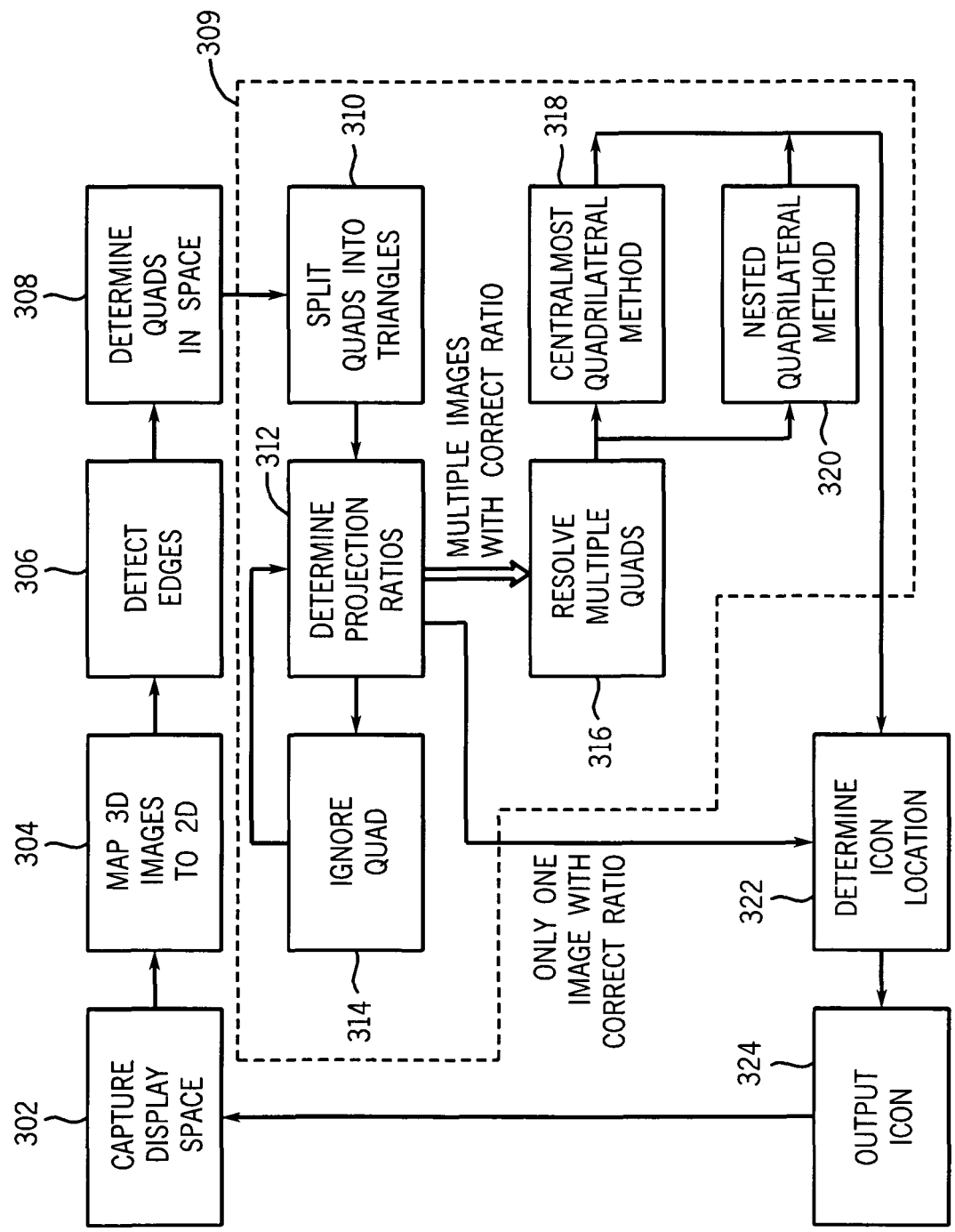
FIG. 3 is a block diagram of an embodiment of a method of recognizing a display using a display recognition device.

Determination of where the icon is positioned on the screen is illustrated according to embodiments in FIG. 3. As illustrated, DRD 100 captures at least one image of the space in which display 400 resides. Generally, this space may comprise a room or an outdoor venue, for example a stadium having a large display, in operation 302. Images may be captured in a variety of analog or digital formats, for example lossy compression (peg), bitmap, tiff compression, and others that would be appropriate for manipulation of the captured image or transfer of the image via a wireless signal.

According to embodiments, after DRD 100 captures an image of the space, the three dimensional images in the image (s) of the space may be mapped from three dimensions to two dimensions in operation 304. This process is performed by the camera lens, as it transforms the three dimensional image into a two dimensional image. Artisans will readily recognize that operations 302 and 304 may be generally accomplished in the same process, that is during the capture of the image by display recognizer 102.

According to embodiments, DRD 100 further comprises an illumination source that illuminates a space in low-light conditions. According to embodiments, the illumination source may provide infrared illumination. Display recognizer 102 may be configured to detect reflected infrared light. Because infrared is outside of the human visible spectrum, an infrared illumination source will not increase the illumination of a dark room as perceived by a human eye, for example.

According to embodiments, once the image has been captured in operation 302 or mapped from 3D to 2D in operation 304, the image may be analyzed in operation 306 to determine edges of the objects in the space, including display 400. Edges are detected, according to embodiments, using both horizontal and vertical scan lines. Scan lines are horizontal or vertical "lines" of an image. Along each scan line, the amplitude of a measurable signal, for example black or white intensity in a black and white image. Thus, the orientation of DRD 100 is irrelevant, as all edges of display 400 will be detected. According to embodiments, display recognizer 102 is positioned at 45°, whereby both vertical edges and horizontal edges are detected in the same step.

According to embodiments, the image captured by DRD 100 is passed through a Gaussian blur filter. Blurring removes high frequencies with low amplitude, which reduces noise that is naturally present in the input captured image. Other noise-reduction algorithms can be used as well.

For two dimensional images, the Gaussian function may be expressed as:

$$G(x, y) = \frac{1}{2\pi\sigma^2}e^{-\frac{x^2+y^2}{2\sigma^2}},$$

where x is the distance from the origin in the horizontal axis, y is the distance from the origin in the vertical axis, and σ is the standard deviation of the Gaussian distribution. According to embodiments, blurring may be achieved by the optical properties of DRD 100.

According to embodiments, the output blurred image may be passed through a Sobel operator to highlight edges. A Sobel operator highlights samples (pixels) with high frequencies (edges), and simultaneously inhibits low frequency pixels. In 2D, the Sobel operator is applied in two passes, one to highlight horizontal edges, and one for vertical.

$$G_y = \begin{bmatrix} +1 & +2 & +1 \\ 0 & 0 & 0 \\ -1 & -2 & -1 \end{bmatrix} * A \text{ and}$$

$$G_x = \begin{bmatrix} +1 & 0 & -1 \\ +2 & 0 & -2 \\ +1 & 0 & -1 \end{bmatrix} * A,$$

where A is the source image, and Gx and Gy are two images which at each point contain the horizontal and vertical derivative approximations. The output is a measurement for the horizontal and vertical gradient at each pixel, Gx and Gy. This output indicates how strong of a horizontal and vertical edge there is at a pixel. The two can be combined to compute an overall gradient G for the pixel:

$$G=\sqrt{G_x^2+G_y^2}$$

Furthermore, the arctan(Gy/Gx) gives the angle, Θ, of the edge at the pixel location:

$$\Theta = \arctan\left(\frac{G_y}{G_x}\right),$$

The output from this step, per pixel, indicates the strength of an edge at every given pixel (G) and the angle of that edge (Θ) (from 0 to 360 degrees).

According to embodiments, the output from the Sobel operation, is provided for Canny edge detection. Where the Sobel operator leaves wide edges, a more precise location of each edge may be provided with Canny edge detection. A Canny algorithm finds the pixels where the gradient intensity G from the Sobel operation is a local minimum or a local maximum compared to its neighboring pixels, and discards all other pixels. For example, a pixel having a value of G and having neighbors on the left and right where G is smaller, the pixel in question is identified as a local maximum and that pixel is preserved, identifying a vertical edge. The same is repeated relative to pixels above and below the pixel in question, identifying a horizontal edge, and relative to diagonal pixels, identifying diagonal edges. The output is an edge map, in which each pixel indicates one of the four types of edges it might contain (horizontal, vertical, and the two diagonals) and its strength.

According to embodiments, the separate pixels may be combined to form continuous lines using hysteresis thresholding. A high threshold and a low threshold are established. Pixels are evaluated to determine whether they have a value that exceeds the high threshold. Pixels with such a value are traced in any direction the contains pixels that don't fall below the low threshold. When a pixel is encountered that has a value that falls below the low threshold, the tracing stops.

According to embodiments, the coordinates of the traced pixels are processed using a least squares method or singular value decomposition, to both check if the pixels are on a straight line, and deduce the line equation. Where two lines share a vertex, a connection is assumed. Where four lines are connected by four vertices, then the four lines are assumed to form a quadrilateral. Where multiple line segments align along a common line, the common line may be inferred and applied for purposes of calculating and identifying quadrilaterals. Where lines segments fail to intersect, each line segment may be extended to evaluate whether the lines would intersect if they were extended.

According to embodiments, using the detected edges, quadrilaterals in the space may be identified in operation 308. Because DRD 100 will not always be positioned at a right angle to display 400, the quadrilaterals captured in the image may not resemble a rectangle having the aspect ratio of display 400, but rather some form of another quadrilateral. For example, if DRD 100 is positioned at an angle of 45°, the closest vertical edge of display 400 will appear to be longer than the farthest vertical edge of display 400 as imaged. Thus, quadrilaterals may be identified rather than rectangles, thereby making irrelevant the angle from which display recognizer 102 is to display 400. Artisans will readily understand that identifiers for qualifying quadrilaterals include apparent aspect ratios, as well as other identifiers.

According to embodiments, after identification of the quadrilaterals in operation 308, one or more operations may be performed in operation set 309 to qualify an identified quadrilateral or one of a set of identified quadrilaterals as display 400. According to embodiments, one or more operations may be performed in operation set 309 to reduce the set of identified quadrilaterals to a set of quadrilaterals potentially qualifying as display 400. According to embodiments, various operations are capable of being performed within operation set 309, in combination or alone, and in any order, wherein each operation has a possibility of qualifying an identified quadrilateral as display 400, eliminating an identified quadrilateral as not being display 400, or ranking an identified quadrilateral based on its probability of being display 400.

According to embodiments, DRD 100 may qualify or eliminate a quadrilateral as display 400 based on properties observed in an operation within operation set 309 and comparison of those properties with predetermined identifiers. According to embodiments, properties observed may include: an apparent aspect ratio of a rectangle corresponding to an identified quadrilateral, a hypothetical location of DRD 100 based on the apparent aspect ratio of a rectangle corresponding to an identified quadrilateral, the location of an identified quadrilateral within an image captured by DRD 100, the amount of visible light emanating from an identified quadrilateral, the amount of infrared radiation emanating from an identified quadrilateral, and the location of an identified quadrilateral relative to other identified quadrilaterals. These properties may be compared with at least one identifier corresponding to analogous features of display 400.

According to embodiments, each identified quadrilateral may be qualified or eliminated based on whether it corresponds to a rectangle having an apparent aspect ratio comparable to the known aspect ratio of display 400. According to embodiments, each identified quadrilateral may be split into a pair of triangles in operation 310. The triangles of each quadrilateral may be analyzed to calculate an apparent aspect ratio as an estimation of the actual aspect ratio of the rectangle to which each quadrilateral corresponds. For example, each of the two triangles may have two sides corresponding to two sides of a given quadrilateral. The ratio of the lengths of the two sides from one triangle may be combined with the ratio of the lengths of the two sides from the other triangle to determine an apparent aspect ratio of the rectangle to which each quadrilateral corresponds. For example, the two ratios may be averaged, summed, combined by a weighted average, or otherwise mathematically combined to estimate the apparent aspect ratio. The apparent aspect ratio may be compared to a desired or predetermined aspect ratio of the desired or predetermined display 400 in operation 312. For example, 4:3 or 16:9 may be a desired or predetermined aspect ratio, although other ratios are also easily adaptable to the principles of the present disclosure. If the apparent aspect ratio of a rectangle corresponding to the given quadrilateral is determined not to fall within a predetermined range of the predetermined aspect ratio of display 400, then the quadrilateral may be ignored in operation 314 and the triangles of the next quadrilateral may be analyzed. If only a single quadrilateral has a requisite ratio, it may be selected and the process may be advanced to operation 322. Otherwise the set of potentially qualifying quadrilaterals may be passed to a resolution process, which may be performed in operation 316 or another operation.

According to embodiments, other aspect ratio-based identifiers may be utilized. For example, a determination of whether a quadrilateral corresponds to a rectangle having the correct ratio may be accomplished by process of elimination. The angle at which a rectangle is viewed affects the appearance of the quadrilateral corresponding to the rectangle when viewed in two-dimensions. Therefore, the process of determining whether a given quadrilateral corresponds to a rectangle having the correct ratio depends on the angle from which the quadrilateral is viewed. In other words, when the image is captured and converted into a 2D image, a transformation occurs for each quadrilateral to map it from a three dimensional shape to two dimensions. The transformation is based on the lens, for example, of the imaging device. For example, a wide angle lens will produce quadrilaterals in an image differently than a fish-eye lens.

Accordingly, to determine whether a given quadrilateral corresponds to a rectangle having a qualifying ratio, an analysis of the 2D image must be de-transformed to determine whether the quadrilateral could actually correspond to a rectangle having a qualifying ratio. Such analysis is based on the known characteristics of the lens, the focal length, and other known data. From these data, a hypothetical location of DRD 100 may be determined based on the quadrilateral that is determined to correspond to a rectangle appearing to have a qualifying aspect ratio and the known data in the de-transformation process. Once the hypothetical location of DRD 100 is known, it can be deemed plausible or eliminated—for example if it were determined that the rectangle would have to be located 20 feet off the floor or go feet away. Indeed, a set of quadrilaterals may yield multiple hypothetical locations of DRD 100 when such an analysis is performed, thereby yielding multiple qualifying quadrilaterals. A selection process would then be performed for each of the quadrilaterals that might qualify to select the quadrilateral that is display 400.

According to embodiments, DRD 100 is primarily used with respect to a single space. Consequently, computer 200 may be initialized whereby the relative positions of the quadrilaterals in a space are known. Thus, once the relationship among the quadrilaterals is determined, the location of display 400 is known based on the interrelationship of the quadrilaterals in a given space. As the system detects changes in the quadrilateral relationships, the full method of determining which quadrilateral is display 400 is performed and the resulting relationship is redetermined. For example, a new framed photograph of a fireplace hearth may be placed on the wall in the space in which display resides after the system has been initialized. At least two additional quadrilaterals will be detected—the frame (including matting and the outline of the photograph itself). By way of example, a television may be shown on display 400 as part of the multimedia content, which would also be detected as an additional quadrilateral.

According to embodiments, to resolve which quadrilateral among multiple potentially qualifying quadrilaterals has the right ratio, a resolution process may be performed in operation 316 or in another operation within operation set 309. The resolution process comprises methods for determining which quadrilateral is display 400 among multiple quadrilaterals having a requisite ratio. According to embodiments, various resolution techniques may be employed to determine which quadrilateral is display 400.

According to embodiments, resolution may be accomplished in operation 318 by selecting the potentially qualifying quadrilateral that is closest to the center of an image captured by DRD 100.

According to embodiments, resolution may be accomplished in operation 320 by selecting one of a plurality of nested quadrilaterals. For example, the outermost one of a plurality of nested quadrilaterals may be selected as display 400. According to embodiments, the largest one of a plurality of nested quadrilaterals may be selected as display 400.

According to embodiments, DRD 100 may gather data regarding the amount of visible light a given identified quadrilateral is emanating. Knowing that display 400 is emanating light in the visible spectrum, DRD 100 may qualify or eliminate an identified quadrilateral based on the amount or relative amount of light it is emanating.

According to embodiments, DRD 100 may gather data regarding the amount of infrared radiation a given identified quadrilateral is emanating. Knowing that display 400 may generate heat, and thereby infrared radiation, DRD 100 may qualify or eliminate an identified quadrilateral based on the amount or relative amount of infrared radiation it is emanating.

According to embodiments, DRD 100 may determine a known image to be shown on display 400 in an operation within operation set 309. The known image may be an image caused to be shown by DRD 100, or the known image may be an image shown on display 400 regardless of DRD 100, wherein DRD 100 is simultaneously aware of the image being shown. DRD 100 may capture a view of the image as it is shown on display 400, and compare the captured view with the known image. Comparison of the captured view with the known image may yield information regarding the direction, orientation, and location of the display 400 and features of the known image shown on display 400 relative to the direction, orientation, and location of DRD 100 at the time it captured the view of the image. For example, display 400 may show an image with features recognizable by DRD 100. The features may be recognizable based on their known characteristics, such as shape, size, color, location relative to other features, etc. The features as captured by DRD 100 demonstrate the location of display 400 within the captured view as well as the location of the features relative to the direction in which DRD 100 is pointed. The captured view may be compared to the known image independent on the viewpoint of DRD 100, based on scale and rotation invariant feature detection. The image shown on display 400 may be fill display 400 or be a partial overlay imposed on at least a portion of display 400. According to embodiments, computer vision algorithms such as SIFT or SURF may be used to recognize the known image as it is shown on display 400 independent of scale or rotation of DRD 100 relative to display 400. This analysis facilitates the determination of where an icon corresponding to the direction of DRD 100 should be displayed on display 400. Such a method may be performed as a single calibration step or repeatedly during operation of DRD 100. Likewise, display recognizer 102 may be used in conjunction with DRD 100 or computer 200 to determine generally the direction in which DRD 100 moves over time, much like the algorithms that control an optical mouse. These methods can be used alone or in conjunction with those or others disclosed herein.

According to embodiments, if the wrong quadrilateral is selected, DRD 100 may have an override button or command sequence whereby the user can tell computer 200 that the wrong quadrilateral was selected. Computer 200 may "remember" the relationship between the quadrilaterals and thereby avoid choosing the quadrilateral that is incorrect in subsequent icon location determination iterations. Thus, for example, if computer 400 selects the screen housing of display 400 rather than the screen itself, the user can instruct computer to select a nested quadrilateral. It should be noted, that if DRD 100 is pointed to a position on the qualifying quadrilateral that isn't display 400, it may select the non-display qualifying quadrilateral and output the icon to the corresponding part of display 400.

According to embodiments, after a quadrilateral is selected as display 400, the location of an icon on display 400 may be determined in operation 322. According to embodiments, the location of the icon on display 400 may be determined by positioning the icon at substantially the center of each captured image. More specifically, according to embodiments, the icon may be placed at the pixel position intersected by the imaginary longitudinal parallel line extending through the center of display recognizer 102 of DRD 100. According to embodiments, the location of the icon on display 400 may correspond to any selected location on the captured image or may be related to any selected location on the captured image, as discussed further herein.

Figure 4:
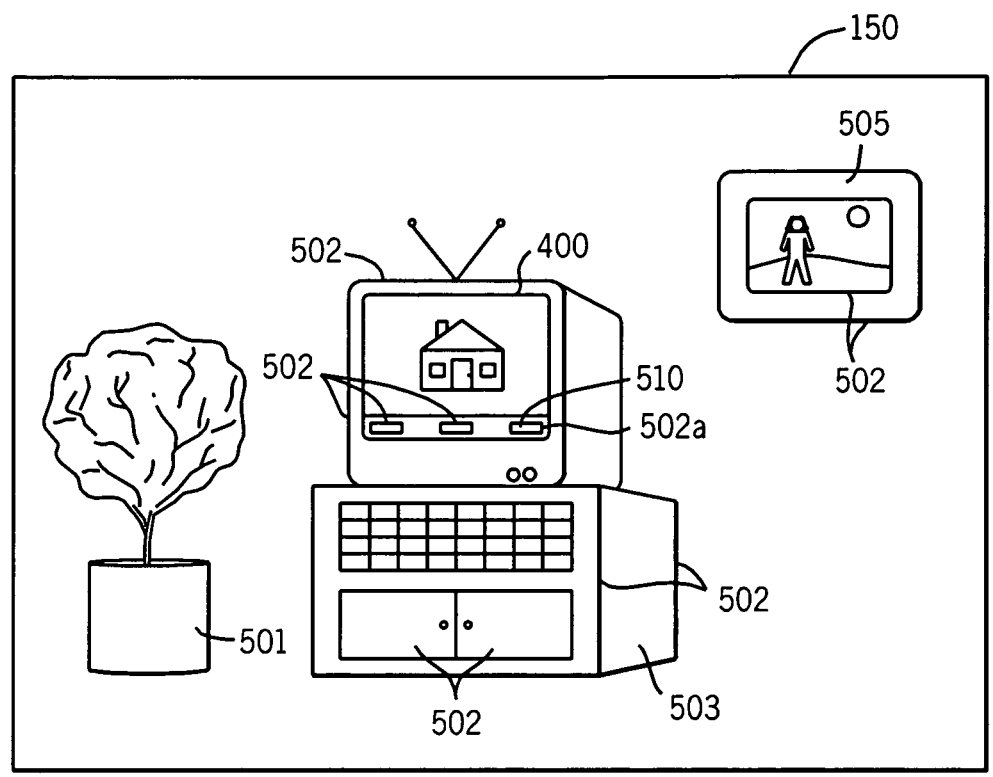
FIG. 4 is an illustration an embodiment of an image captured by display recognition device and used to identify a display.
Figure 5A:
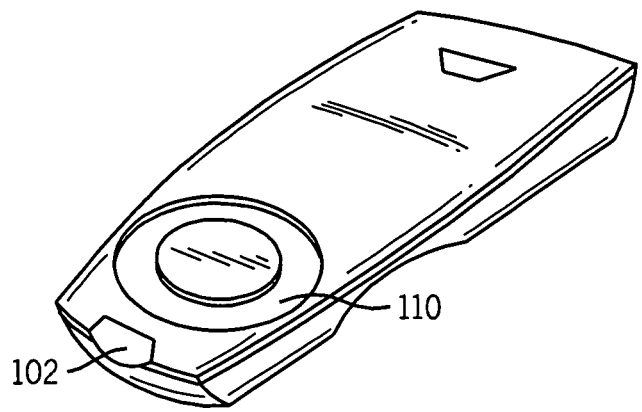
FIG. 5 is a view of an embodiment of a display recognition device of the present disclosure.
Figure 5B:

For example, according to embodiments illustrated in FIG. 4, there is shown image 150 captured by display recognizer 102. Image 150 comprises an image of space having potted plant 501, a television having display 400, a television stand 503, and wall hanging 505. Within image 150, there exist a number of quadrilaterals 502, including frame of wall hanging 505, photograph of wall hanging 505, cabinet doors of television stand 503, front and side walls of television stand 503, display 400, and rectangular icons shown on display 400, house door, window, and chimney shown on display 400 as part of the multimedia content. It will be appreciated by artisans that chimney is an irregular quadrilateral, wherein not every angle within the quadrilateral is a right angle. According to embodiments, the methods herein may rule out such quadrilaterals as soon as they are determined to be substantially irregular. Center 510 of image 150 may be represented by a dot.

According to embodiments, image 150 may also be subject to one or more operations (for example, in operation set 309) to qualify or eliminate an identified quadrilateral within image 150 as display 400, as discussed herein. According to embodiments, image 150 may be subject to one or more operations (for example, in operation 322) to determine the location of an icon on display 400.

According to embodiments, each quadrilateral identified in image 150 may be divided into two triangles and the apparent aspect ratio of the rectangle corresponding to each quadrilateral is determined. For example, if the apparent aspect ratio is not 4:3, 16:9, or another predetermined aspect ratio corresponding to the known characteristics of display 400, then the quadrilateral is not determined to be display 400.

Assume that photograph of wall hanging 505 and display 400 are each determined to have an aspect ratio of 4:3. Photograph of wall hanging 505 and display 400 must both go through a resolution step whereby it is determined which is display 400. According to embodiments, the quadrilateral closest to the center 510 of image is selected, which this time corresponds to display 400, wherein center 510 indicates the location toward which DRD 100 is pointed.

Assume, however, that display 400 and rectangular icon 502a are determined to be 4:3 and 16:9 respectively. Accordingly, the resolution step would determine that rectangular icon 502a is nested inside of display 400 and therefore select display 400 as the quadrilateral representing display (i.e., choosing the outmost of nested qualifying quadrilaterals).

According to embodiments, the icon may be placed corresponding to the position in the selected quadrilateral closest to center 510. The icon would be positioned corresponding to the same position of center 510. According to embodiments, this position can be represented by an X %, Y % values with respect to display 400 (selected quadrilateral). According to embodiments, position can be represented as a horizontal and vertical pixel coordinates, provided the resolution of display 400 is known. Artisans will known and understand the various other methods of representing the coordinates where icon should be placed.

According to embodiments, the selected location on image 150 corresponds to the location of the icon on display 400. A quadrilateral selected as display 400 appears on image 150. The selected location on image 150 may be within the quadrilateral. The quadrilateral may be divided into two triangles, and the selected location may be determined to be within one of these two triangles. Barycentric or areal coordinates may be determined based on the position of the selected location relative to the vertices of the triangle within which the selected location appears on image 150. Because the vertices of the triangle correspond to three known vertices of display 400, the coordinates may be mapped onto display 400 to determine the appropriate location for the icon to be shown on display 400.

After the coordinates of where DRD 100 is pointed are known, icon is output to display 400 in operation 324, corresponding with the position where DRD 100 is pointed. According to embodiments, the above-described process may be repeated over a rapid interval, for example 10 times per second, whereby the icon will appear to be responsive to even small movements of DRD 100 with respect to where DRD 100 is aimed.

According to embodiments, an apparent aspect ratio of a rectangle corresponding to a quadrilateral identified in image 150 may be determined based on the four vertices of each quadrilateral. The actual position (including location and orientation) of DRD 100 with respect to each identified quadrilateral and the actual aspect ratio corresponding to each identified quadrilateral may be unknown. A hypothetical position of DRD 100 relative to each identified quadrilateral may be calculated, and each hypothetical position may be evaluated for its likelihood to be the actual position of DRD 100.

According to embodiments, knowing a predetermined aspect ratio corresponding to the known characteristics of display 400 (4:3, 16:9, etc.), and knowing the optical characteristics of DRD 100, a hypothetical position corresponding to each identified quadrilateral may be calculated. The hypothetical position for a given quadrilateral is the position that DRD 100 would need to assume for the given quadrilateral to correspond to a rectangle having an actual aspect ratio equal to that of display 400. The actual aspect ratio is calculable based on the apparent aspect ratio, the optical characteristics of DRD 100, and the assumed hypothetical position of DRD 100. Thus, an assumption for the purpose of calculation may be made for each identified quadrilateral that it is or may be display 400.

For example, if the apparent aspect ratio of a first rectangle having a corresponding first quadrilateral based on image 150 is 4:3, and display 400 is known to be 4:3, then the first hypothetical position of DRD 100 (relative to the first quadrilateral) at the time image 150 was captured would be a position orthogonal to the first quadrilateral. The first hypothetical position may not be the actual position of DRD 100 relative to the first quadrilateral. If the apparent aspect ratio of a second rectangle having a corresponding second quadrilateral based on image 150 is 5:3, and display 400 is known to be 4:3, then the second hypothetical position of DRD 100 (relative to the second quadrilateral) at the time image 150 was captured would be a position that would transform an actual aspect ratio of 4:3 into an apparent aspect ratio of 5:3 (such as a position not orthogonal to the second quadrilateral). The second hypothetical position may not be the actual position of DRD 100 relative to the second quadrilateral.

According to embodiments, DRD 100 may compare each hypothetical position and determine which is most likely the actual position of DRD 100. For example, where the first hypothetical position is orthogonal to the first quadrilateral, and the second hypothetical position is not orthogonal to the second quadrilateral, DRD 100 may conclude that the first hypothetical position is preferred, based on an assumption that a user is more likely to position DRD 100 orthogonally to display 400. Therefore, DRD 100 may assume that the first quadrilateral is display 400, and select it accordingly. Any assumption regarding preferred positions of DRD 100 relative to display 400 may be pre-selected, user-defined, or based on usage data relating to the historical position of DRD 100. These principles are also applicable for determination of the location of DRD 100 in three-dimensional space. This information may be used as a source of input, for example in a gaming context to position a flashlight beam based on the direction DRD 100 is pointed and the origin of DRD 100 relative to display 400.

According to embodiments, at least one of the operations of FIG. 3 are performed on DRD 100 and at least one of the operations of FIG. 3 are performed on computer 200. Variations or permutations as to what device (DRD 100 or computer 200) performs what operation are possible and are determined on a case-by-case basis depending on the design factors and other characteristics of DRD 100 and computer 200. For example, DRD 100 may solely capture an image display space in operation 302 and transfer each image as a low bandwidth lossy compressed file for processing on computer 200 for completion of the other steps. According to embodiments, DRD 100 may perform capture of the display space in operation 302 followed by mapping of the three dimensional image to a 2D image. The 2D image is then transmitted to computer 200 for further processing. A third example may comprise a larger DRD 100 that is capable of performing more complex computations and therefore performs all of the computations through operations 318 and 320 and sends only a set of icon coordinates to computer 200 for display on display 400.

According to embodiments, computer 200 outputs to display 400 a graphical user interface (GUI) that displays the location of icon, as is well known and understood by artisans. According to embodiments, computer 200 outputs a signal that comprises the entire content of display 400, thereby facilitating a viewing experience much like a console video game system or digital video recording system complete with multimedia content or games, and an operating interface that allows users to manipulate items within the GUI to interface with computer 200.

According to embodiments, computer 200 outputs an overlay having at least one of an icon and a set of menu items. Thus, for example, computer may run programs in the native operating system, except allowing DRD 100 to control the computer. For example, users may surf the internet using the DRD 100, which runs in a proprietary operating system and communicates with an internet browser that runs in the native operating system, for example one of the Microsoft Windows suites, Macintosh Operating System, or unix/linux-based operating systems.

According to embodiments, sender 300 and receiver 350 are specialized components for sending a signal to output to display 400 wirelessly. According to embodiments, computer 200 preformats and outputs signal to sender 300. Sender 300 transmits wirelessly the signal, which is received by receiver 350. Receiver 350 is equipped with at least one output connector for connection to display 400, for example coaxial cable connector, RCA connectors, S-video connectors, component connectors, or HDMI connector. Specialized audio connectors are expressly contemplated as well, including digital output, for example PCM audio output, etc.

The wireless signal by which sender 300 and receiver 350 connect may comprise industry standard signals, including IEEE 802.11, IEEE 802.15.x, or low power UHF, VHF, or common EM signals with sufficient bandwidth to communicate the signal output from computer 200. For example, a low-level HD formatted broadcast may be transmitted by sender 300 and received by receiver 350, which, according to embodiments, comprises a stand-alone ATSC, DVB, ISDB, DTMB, DMB, or other standard broadcast tuner tuned to the frequency that the sender is broadcasting. According to embodiments, receiver may comprise an ATSC, DVB, ISDB, DTMB, DMB, or other standard broadcast tuner built into display 400. According to embodiments, sender 300 may communicate with receiver 350 according to Conditional Access System for Terrestrial Broadcast protocols, allowing an over-the-air broadcast signal to be "scrambled" so it can be interpreted and displayed only by an authorized and corresponding receiver 350. Accordingly, unauthorized receivers would be unable to interpret a signal, thus avoiding interference between non-corresponding sets of senders and receivers.

According to embodiments, receiver 350 may have built-in networking capability (even in cases where receiver is built-in to display 400), such as WiFi or Bluetooth. Naturally, for any standard signal technology used by receiver is also possible for used in sender, and visa versa. Sender 300 and receiver 350 also expressly contemplate use of non-standard or proprietary wired and wireless signals used to shared data between sender 300 and receiver 350.

According to embodiments, sender 300 may communicate with receiver 350 through a variety of wireless and wired communication pathways, such as a direct wired connection or through the Internet or other known protocols. Indeed, sender 300 may communicate with receiver 350 via WiFi, USB, Bluetooth, or other networking standard. Sender 300 may also communicate wirelessly using a low power standard definition (e.g., NTSC, PAL, SECAM) or high definition (e.g., ATSC, DVB, ISDB, DTMB, DMB) broadcast signals, or a proprietary wireless signal.

According to embodiments, sender 300 may send an HD signal to receiver 350 on an open frequency that is not tunable by built in tuners in display 400, etc. Receiver 350 receives the signal on the open frequency and either outputs the signal via well-known video connections (e.g., HDMI, component, S-video, composite, coaxial, etc.) or shifts the frequency to a frequency required by ATSC tuners, for example one built into display 400, and feed the signal to the ATSC tuner via a wire, according to embodiments. DRD 100 may optionally allow users to specify the HD frequency that is transmitted, thereby allowing users to avoid conflicting over the air or DRD 100 broadcast signals.

According to embodiments, the functions of computer 200, sender 300, and receiver 350 may be integrated into a single hardware unit that connects with display 400 via a hard-wired connection, as described previously and well understood and known to artisans. Other combinations are similarly possible, for example where display 400, computer 200, sender 300, and receiver 350 are integrated into a single device. Indeed, according to embodiments, sender 300 and receiver 350 may be omitted in embodiments, wherein computer 200 is connected directly to display 400 and outputs a preformatted signal to display 400. Generally, artisans will understand that the functions of sender 300 and receiver 350 may be accomplished with a variety of devices or sub-devices that function similarly.

In various embodiments, these devices and methods are operational in a multimedia infrastructure or with numerous other general purpose or special purpose computing system environments or configurations or other complex systems. Examples of well known computing systems, environments, or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The devices and methods may be described in the general context of computer-executable instructions, such as program modules, being executed by a computer. Generally, program modules include routines, programs, objects, components, data structures, etc. that perform particular tasks or implement particular abstract data types. The system may also be practiced in distributed computing environments where tasks are performed by remote processing devices that are linked through a communications network. In a distributed computing environment, program modules may be located in both local and remote computer storage media including memory storage devices. The computer programs are stored in a memory medium or storage medium or they may be provided to a processing unit through a network or I/O bus.

In one aspect, the DRD 100 includes at least one central processing unit (CPU) or processor. The CPU can be coupled to a memory, ROM or computer readable media containing the computer-executable instructions. Computer readable media can be any available media that can be accessed by the system and includes both volatile and nonvolatile media, removable and non-removable media implemented in any method or technology for storage of information such as computer readable instructions, data structures, program modules or other data. Computer storage media includes, but is not limited to, RAM, ROM, EEPROM, flash memory, portable memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the devices of this disclosure. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of any of the above should also be included within the scope of computer readable media. The computer readable media may store instructions or data which implement all or part of the system described herein.

The process described above can be stored in a memory of a computer system as a set of instructions to be executed. In addition, the instructions to perform the processes described above could alternatively be stored on other forms of machine-readable media, including magnetic and optical disks. For example the processes described could be stored on machine-readable media, such as magnetic disks or optical disks, which are accessible via a disk drive (or computer-readable medium drive). Further, the instructions can be downloaded into a computing device over a data network in a form of compiled and linked version.

Alternatively, the logic to perform the processes as discussed above could be implemented in additional computer or machine readable media, such as discrete hardware components as large-scale integrated circuits (LSI's), application-specific integrated circuits (ASIC's), firmware such as electrically erasable programmable read only memory (EEPROM's); and electrical, optical, acoustical and other forms of propagated signals (e.g., carrier waves, infrared signals, digital signals, etc.).

While the apparatus and method have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A system comprising:
a display recognition device having at least a display recognizer and an input device, wherein the display recognition device is configured to capture an image of a space containing a display;
a computer comprising a multimedia platform and configured to receive data from the display recognition device; and
a sender and a receiver connected to the computer, wherein the receiver is in data communication with the display and wherein the sender and receiver are configured to transfer a signal from the computer to a display;
wherein the system is configured to transform elements of the image such that the system forms at least one quadrilateral from the image by combining separate pixels to form continuous lines and processing coordinates of the combined pixels to deduce at least one line equation and detect edges of at least one quadrilateral, divide each of the identified quadrilaterals into two triangles having two sides corresponding to adjacent sides of the identified quadrilaterals, calculate the ratios of the two sides of each of the two triangles, combine the ratios to obtain an apparent aspect ratio, and compare the apparent aspect ratio with a known aspect ratio of the display; and
wherein the system is configured to select one of the at least one quadrilateral as a selected quadrilateral corresponding to the display.

2. The system of claim 1, wherein the display recognizer comprises a video capture device.

3. The system of claim 2, wherein the video capture device is at least one of a charge-coupled device or a CMOS digital sensor.

4. The system of claim 1, wherein the computer, sender, and receiver are grouped in a single housing; wherein the receiver connects to the display via a wire.

5. The system of claim 1, wherein the computer is connected via wire to the sender and the sender and the receiver exchange data via wireless signal.

6. The system of claim 1, wherein the signal is a standard television broadcast signal; and
the receiver is a standard television broadcast receiver built-in to the display.

7. A method comprising:
capturing an image of a space with a display recognition device having a display recognizer, the space having within it a display;
locating in the image at least one property of the display;
transforming the at least one property of the display by forming at least one quadrilateral from the image to obtain a set of identified quadrilaterals by combining separate pixels to form continuous lines and processing coordinates of the combined pixels to deduce at least one line equation and detect edges of at least one quadrilateral;
determining whether an identifier is present within each of the formed quadrilaterals to obtain a set of qualifying quadrilaterals, wherein the identifier corresponds to a feature of the display; and
resolving the potentially qualifying quadrilaterals to select a selected quadrilateral;
wherein determining whether an identifier is present within each of the identified quadrilaterals comprises:
dividing each of the identified quadrilaterals into two triangles having two sides corresponding to adjacent sides of the identified quadrilaterals;
calculating the ratios of the two sides of each of the two triangles;
combining the ratios to obtain an apparent aspect ratio; and
comparing the apparent aspect ratio with a known aspect ratio of the display.

8. The method of claim 7, further comprising: mapping three dimensional space to two dimensional images.

9. The method of claim 7, wherein the locating in the image at least one property of the display comprises: detecting at least one edge of a quadrilateral.

10. The method of claim 7, wherein the resolving comprises: at least one of selecting the central-most quadrilateral, selecting the outermost of nested qualifying quadrilaterals, and combinations thereof.

11. The method of claim 7, wherein the set of qualifying quadrilaterals is obtained by calculating an apparent aspect ratio corresponding to each identified quadrilateral and comparing the apparent aspect ratio to a known aspect ratio of the display.

12. The method of claim 7, wherein the set of qualifying quadrilaterals is obtained by calculating a hypothetical location of the display recognition device relative to each of the identified quadrilaterals and qualifying the quadrilaterals that correspond to the most plausible hypothetical locations of the display recognition device based on a known aspect ratio of the display.

13. The method of claim 7, wherein the quadrilateral is identified based on a feature known to be on the display, using feature detection computer vision algorithms such as SIFT and SURF.

14. A method comprising:
   capturing an image of a space with a display recognition device having display recognizer, the space having within it a display;
   transforming at least one element of the image by forming a quadrilateral from the image corresponding to the display by combining separate pixels to form continuous lines and processing coordinates of the combined pixels to deduce at least one line equation and detect edges of at least one quadrilateral;
   determining a location where the display recognition device is pointed, wherein the location where the display recognition device is pointed corresponds to a predetermined location on the image relative to the quadrilateral in the image corresponding to the display; and
   transmitting to the display the location of an icon, wherein the location of the icon corresponds to the location where the display recognition device is pointed;
   wherein determining a location where the display recognition device is pointed comprises:
   dividing the quadrilateral into two triangles, each triangle having three vertices and two sides corresponding to adjacent sides of the quadrilateral;
   determining which of the two triangles the display recognition device is pointed to determine a selected triangle; and
   calculating the coordinates of the location where the display recognition device is pointed relative to each of the three vertices.

15. The method of claim 14, wherein the predetermined location on the image is a center of the image.

16. The method of claim 14, wherein the location of the icon is the location where the display recognition device is pointed.

17. The method of claim 14, wherein the location of the icon comprises a direction from a center of the display and a distance from the center of the display;
   wherein the direction from the center of the display corresponds to the direction from the center of the quadrilateral to where the display recognition device is pointed; and
   wherein the distance from the center of the display is the distance from the center of the quadrilateral to where the display recognition device is pointed, multiplied by a factor.

18. A non-transitory machine-readable medium having program instructions stored thereon executable by a processing unit for performing the steps of:
   capturing an image of a space with a display recognition device having a display recognizer, the space having within it a display;
   locating in the image at least one property of the display;
   transforming the at least one property of the display by forming at least one quadrilateral from the image to obtain a set of identified quadrilaterals by combining separate pixels to form continuous lines and processing coordinates of the combined pixels to deduce at least one line equation and detect edges of at least one quadrilateral;
   determining whether an identifier is present within each of the formed quadrilaterals to obtain a set of qualifying quadrilaterals, wherein the identifier corresponds to a feature of the display; and
   resolving the potentially qualifying quadrilaterals to select a selected quadrilateral;
   wherein determining whether an identifier is present within each of the identified quadrilaterals comprises:
   dividing each of the identified quadrilaterals into two triangles having two sides corresponding to adjacent sides of the identified quadrilaterals;
   calculating the ratios of the two sides of each of the two triangles;
   combining the ratios to obtain an apparent aspect ratio; and
   comparing the apparent aspect ratio with a known aspect ratio of the display.

19. The machine-readable medium of claim 18, wherein the resolving comprises: at least one of selecting the central-most quadrilateral, selecting the outermost of nested qualifying quadrilaterals, and combinations thereof.

* * * * *